(12) United States Patent
Koga et al.

(10) Patent No.: US 10,476,337 B2
(45) Date of Patent: Nov. 12, 2019

(54) STATOR

(71) Applicant: AISIN AW CO., LTD., Anjo-shi, Aichi-ken (JP)

(72) Inventors: Kiyotaka Koga, Nishio (JP); Shingo Hashimoto, Okazaki (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 320 days.

(21) Appl. No.: 15/504,955

(22) PCT Filed: Sep. 18, 2015

(86) PCT No.: PCT/JP2015/076802
§ 371 (c)(1),
(2) Date: Feb. 17, 2017

(87) PCT Pub. No.: WO2016/043330
PCT Pub. Date: Mar. 24, 2016

(65) Prior Publication Data
US 2017/0264157 A1    Sep. 14, 2017

(30) Foreign Application Priority Data

Sep. 18, 2014 (JP) ................. 2014-190453

(51) Int. Cl.
*H02K 3/28* (2006.01)
*H02K 3/12* (2006.01)
(Continued)

(52) U.S. Cl.
CPC ............. *H02K 3/28* (2013.01); *H02K 1/16* (2013.01); *H02K 3/12* (2013.01); *H02K 15/0068* (2013.01)

(58) Field of Classification Search
CPC ............ H02K 3/28; H02K 1/16; H02K 15/00; H02K 3/12; H02K 15/0068; H02K 15/045
(Continued)

(56) References Cited

U.S. PATENT DOCUMENTS

| 8,330,318 | B2 * | 12/2012 | Saito ................. H02K 3/12 |
| | | | 310/179 |
| 2008/0174199 | A1 * | 7/2008 | Ishigami ............. H02K 3/12 |
| | | | 310/199 |

(Continued)

FOREIGN PATENT DOCUMENTS

| JP | 2009-219343 A | 9/2009 |
| JP | 2011-151999 A | 8/2011 |

(Continued)

OTHER PUBLICATIONS

Dec. 15, 2015 Search Report issued in International Patent Application No. PCT/JP2015/076802.

*Primary Examiner* — Mang Tin Bik Lian
*Assistant Examiner* — Leda T Pham
(74) *Attorney, Agent, or Firm* — Oliff PLC

(57) ABSTRACT

A stator that includes an annular stator core having a plurality of slots and a plurality of coils attached to the stator core, the plurality of coils each including a main body that is inserted in the plurality of slots and includes two slot housed portions and coil end portions including oblique portions extending obliquely with respect to the axial direction, a radially first side end portion formed from one of the slot housed portions, and a radially second side end portion formed from the other one of the slot housed portions.

28 Claims, 12 Drawing Sheets

(51) Int. Cl.
  *H02K 1/16*     (2006.01)
  *H02K 15/00*    (2006.01)
(58) Field of Classification Search
  USPC .............................. 310/310, 179, 184, 215
  See application file for complete search history.

(56) References Cited

U.S. PATENT DOCUMENTS

| | | |
|---|---|---|
| 2009/0200888 A1 | 8/2009 | Tanaka et al. |
| 2009/0267441 A1* | 10/2009 | Hiramatsu ............... H02K 3/28 310/208 |
| 2012/0025658 A1* | 2/2012 | Watanabe ................ H02K 3/12 310/179 |
| 2015/0123503 A1* | 5/2015 | Hashimoto ............. H02K 3/18 310/71 |

FOREIGN PATENT DOCUMENTS

| | | |
|---|---|---|
| JP | 2012-125043 A | 6/2012 |
| WO | 2014/007176 A1 | 1/2014 |

* cited by examiner

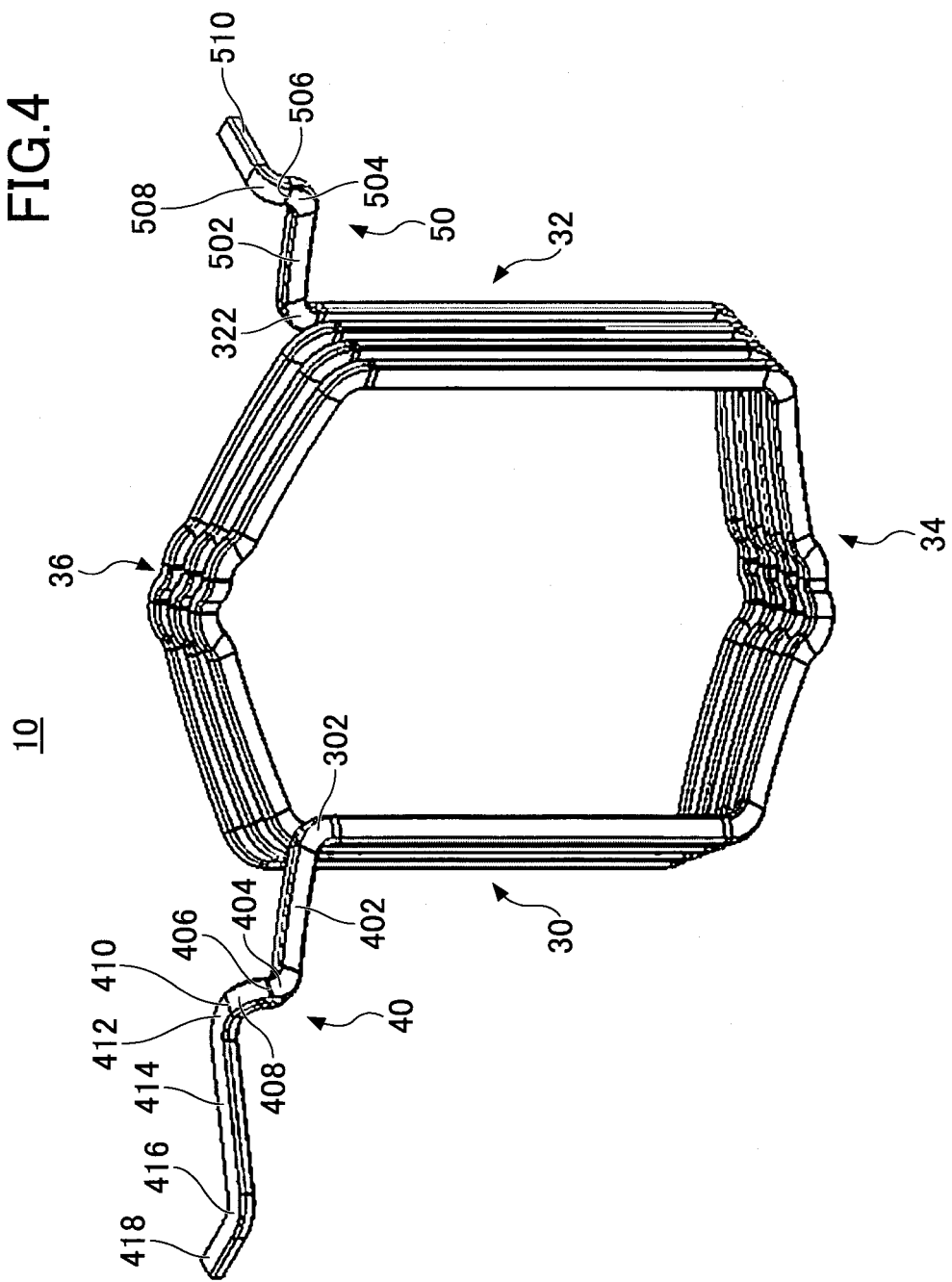

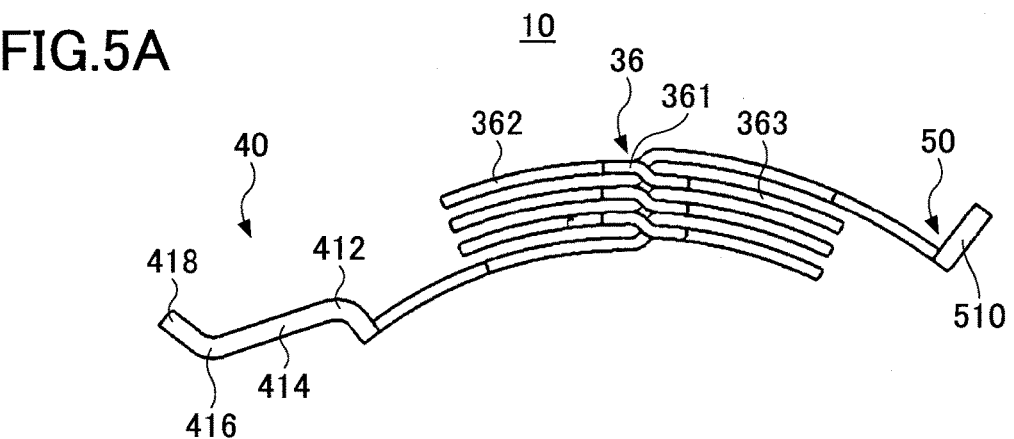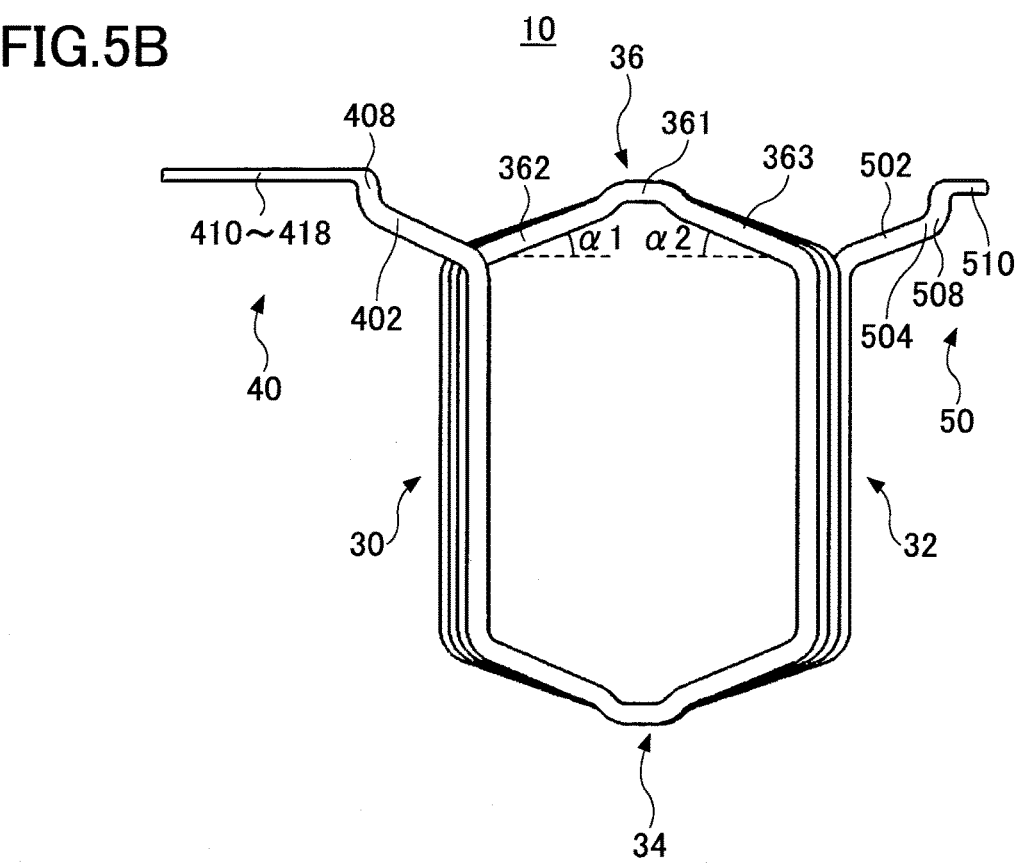

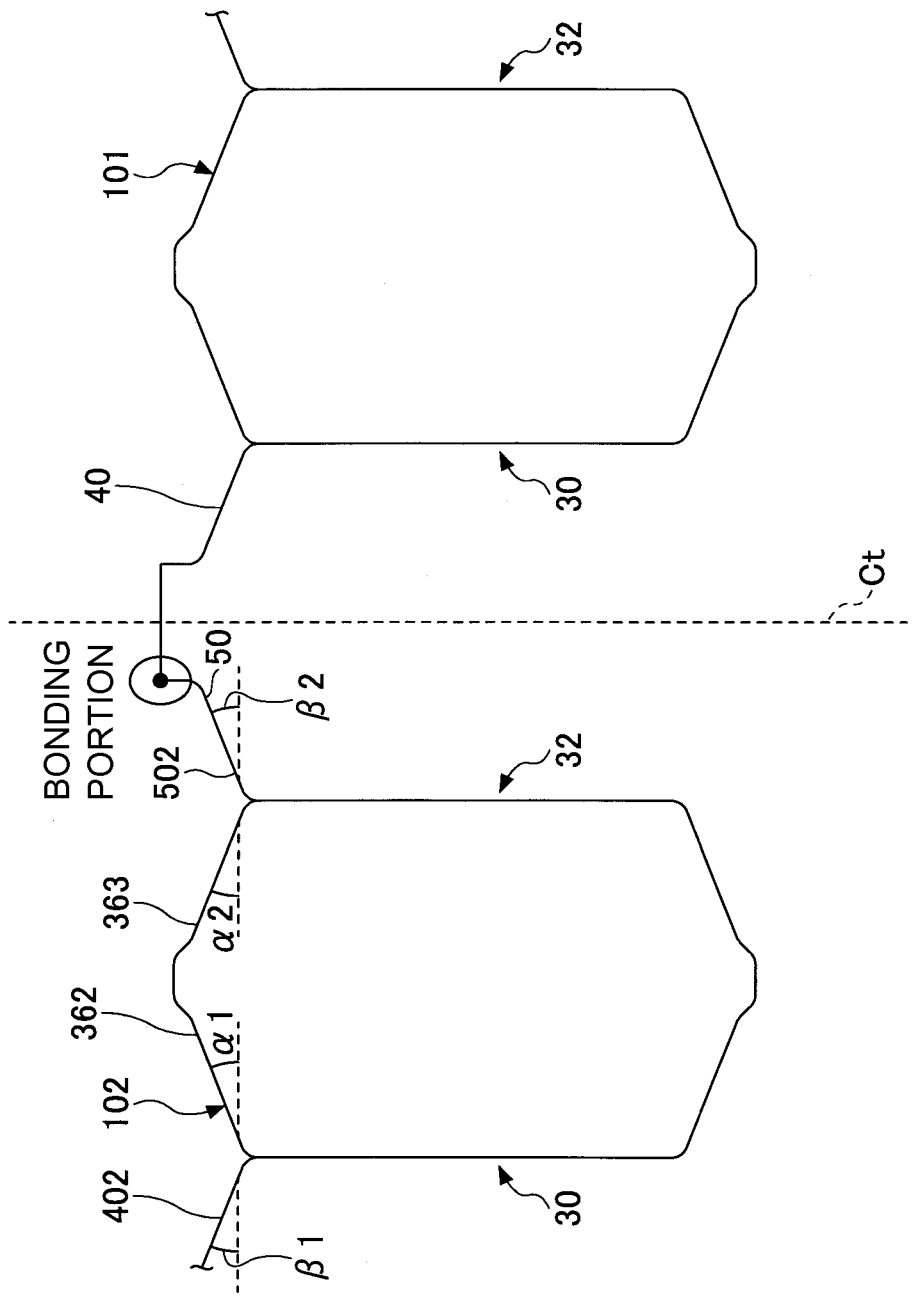

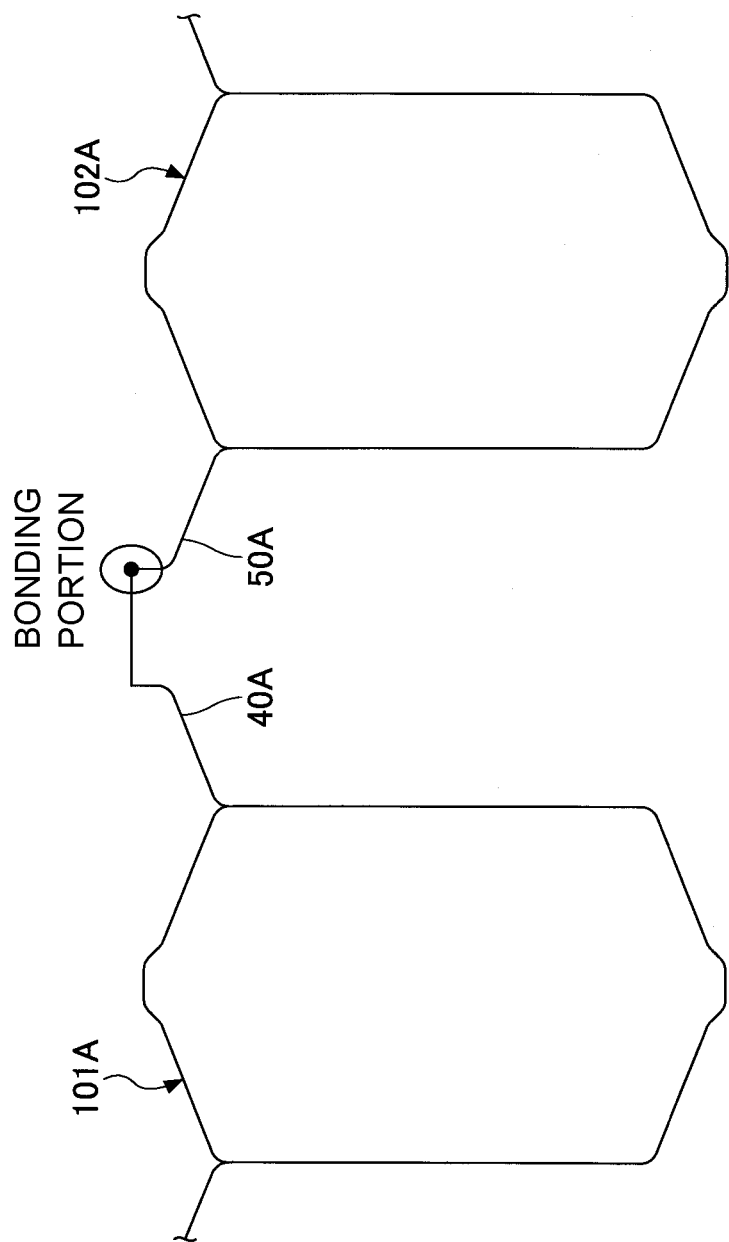

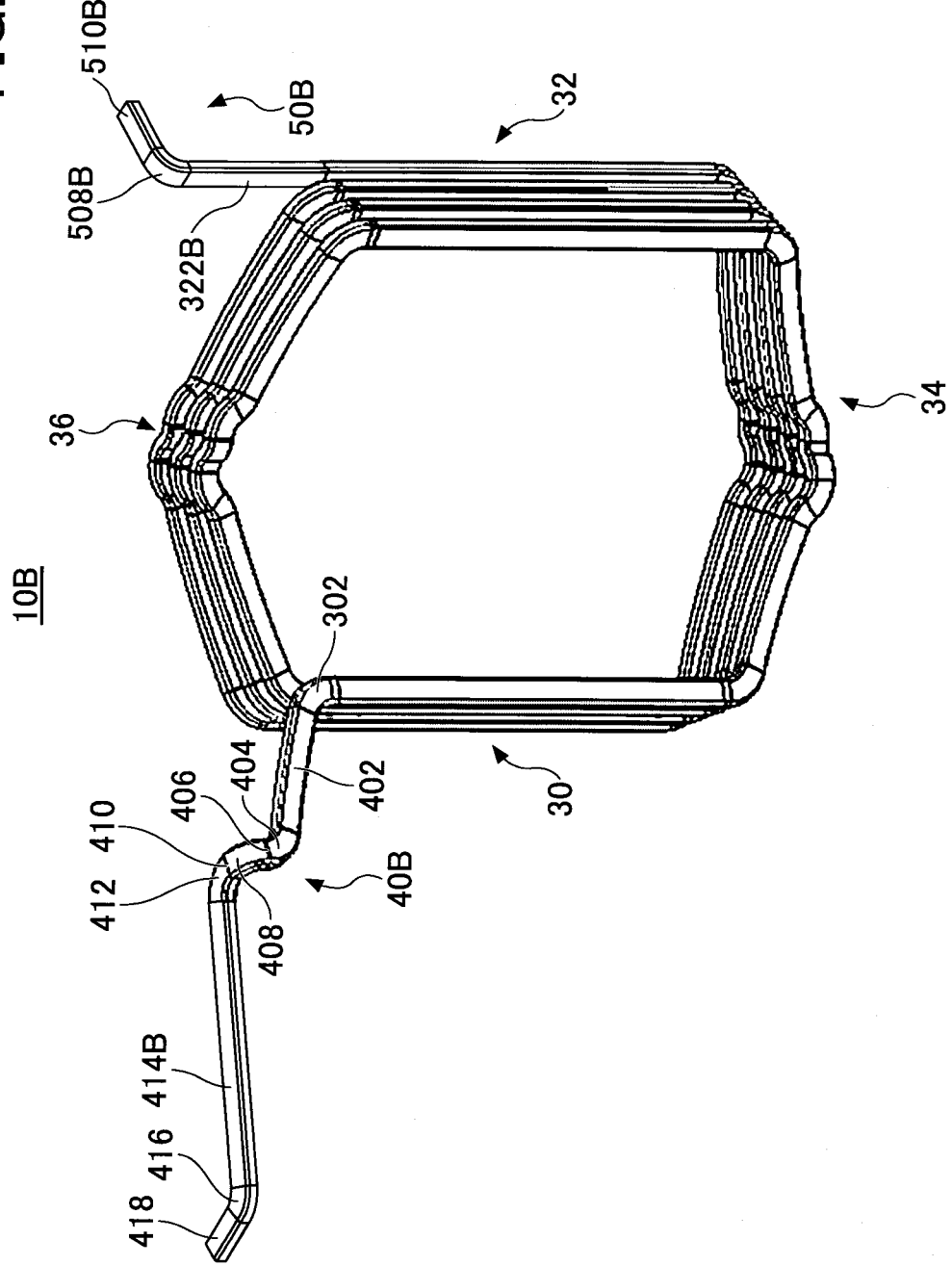

US 10,476,337 B2

STATOR

BACKGROUND

The present disclosure relates to a stator.

A motor is known, in which a first concentric winding coil and a second concentric winding coil are attached as overlapped with each other (for example, refer to Japanese Patent Application Publication No. 2012-125043). In addition, an angle of an oblique portion of a coil that is connected to another conductive wire is configured to be greater than an angle of an oblique portion of a main body of the coil (for example, Japanese Patent Application Publication No. 2011-151999).

SUMMARY

Such a coil as disclosed in Japanese Patent Application Publication No. 2012-125043 includes an end portion on a radially inner side and an end portion on a radially outer side. Between two concentric winding coils to be attached at positions far from each other in a circumferential direction, the end portion on the radially inner side of one concentric winding coil is bonded to the end portion on the racially outer side of the other. The bonding position between the end portions of the two coils of the motor disclosed in Japanese Patent Application Publication No. 2012-125043 is set at an intermediate position between the end portions in the circumferential direction. However, in a case in which the bonding position between the end portions of the two concentric winding coils is set at the intermediate position between the end portions in the circumferential direction, combined bending (combined bending of flatwise bending and edgewise bending) is required at the end portions, which causes heavy damage to coil coating.

In order to reduce the combined bending, as disclosed in Japanese Patent Application Publication No. 2011-151999, it is considered that the angle of the oblique portion of the coil that is connected to another conductive wire is made greater than the angle of the oblique portion of the main body of the coil. However, such a configuration includes a problem that a size of a stator in an axial direction becomes large.

An exemplary aspect of the present disclosure provides a stator in which coils including end portions capable of reducing the damage to the coil coating while reducing an enlargement in the size of the stator in the axial direction, are attached.

According to an exemplary aspect of the present disclosure, a stator is provided, which includes: an annular stator core having a plurality of slots, wherein an axial direction, a radial direction, and a circumferential direction are defined using the stator core as a reference, one of a radially outer side and a radially inner side is a radially first side, and the other of the radially outer side and the radially inner side is a radially second side; and a plurality of coils attached to the stator core, the plurality of coils each including a main body that is inserted in the plurality of slots and includes two slot housed portions and coil end portions including oblique portions extending obliquely with respect to the axial direction, a radially first side end portion formed from one of the slot housed portions, and a radially second side end portion formed from the other one of the slot housed portions, wherein the plurality of coils includes a first coil and a second coil that is housed in slots located away, in the circumferential direction, from slots in which the first coil is housed and that is provided with the radially second side end portion to be bonded to the radially first side end portion of the first coil, and the radially first side end portion includes a first oblique portion extending obliquely with respect to the axial direction and an end portion extending toward the second coil in the radial direction and the circumferential direction.

According to the present disclosure, a stator can be achieved, in which coils including an end portion extending toward the second coil in the radial direction and the circumferential direction, thereby capable of reducing damage to coil coating while reducing an enlargement in the size of the stator in the axial direction, are attached.

BRIEF DESCRIPTION OF THE DRAWINGS

FIG. 4 is a perspective view of a single rectangular wire concentric winding coil.

FIG. 5A shows a single rectangular wire concentric winding coil.

FIG. 5B shows a single rectangular wire concentric winding coil.

FIG. 6 is a developed view schematically illustrating relation between two rectangular wire concentric winding coils.

FIG. 11 is a developed view schematically illustrating relation between two rectangular wire concentric winding coils.

FIG. 12 shows a modification example of a rectangular wire concentric winding coil.

DETAILED DESCRIPTION OF EMBODIMENTS

Hereinafter, various embodiments are explained in detail with reference to attached drawings.

Figure 1:
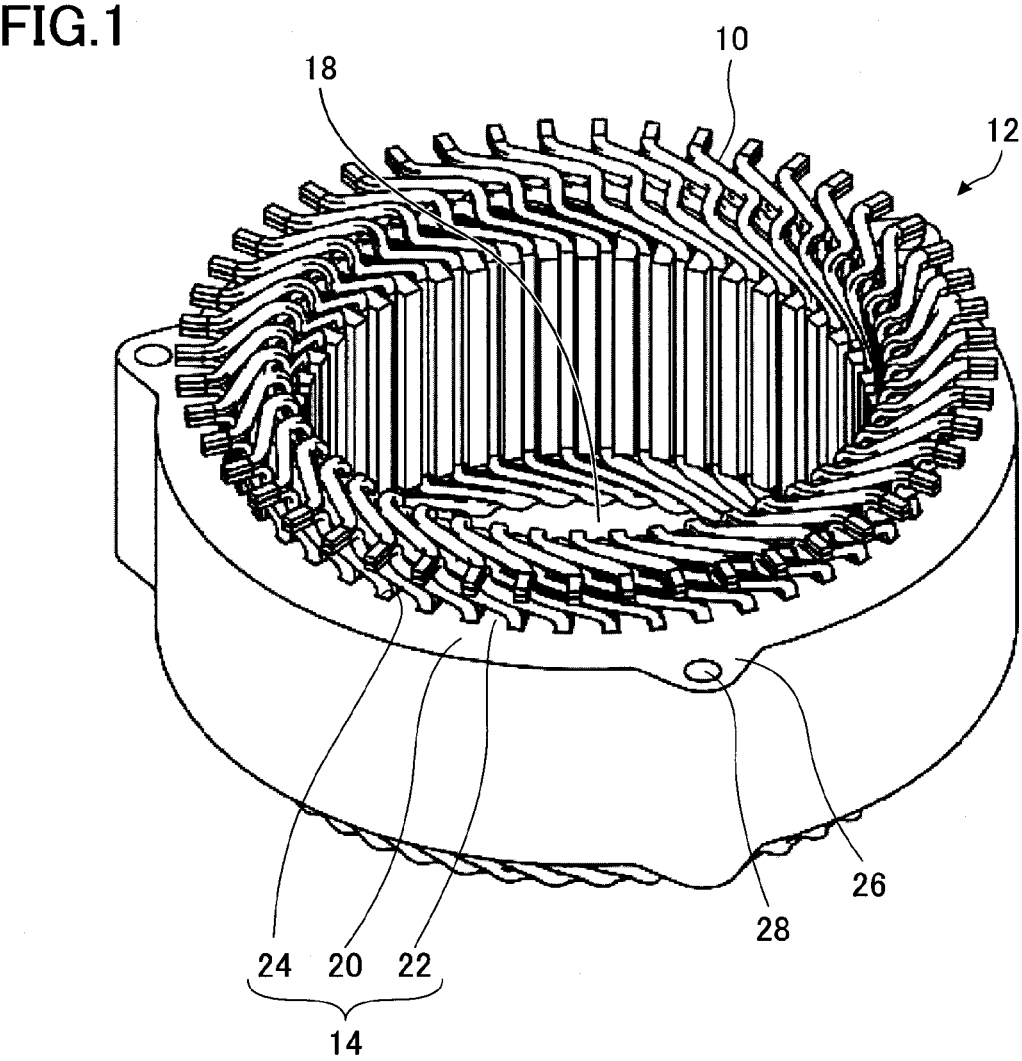
FIG. 1 is a perspective view of a stator according to an embodiment.

FIG. 1 is a perspective view of a stator 12 according to an embodiment. In FIG. 1, a rotor is not illustrated. Hereinafter, an axial direction, a radial direction, and a circumferential direction are defined using an annular stator core 14 as a reference. In addition, a side far from a center in the axial direction of the stator core 14 is defined as an axially outer side.

The stator 12 is provided with rectangular wire concentric winding coils 10 and the stator core 14. The rectangular wire concentric winding coils 10 are stator coils utilized in the stator 12. The stator 12 is a stationary element for use in, e.g., rotating electrical machines such as a three-phase alternating current motor. The stator 12 is a member placed on a radially outer side of the rotor (not shown) as a rotary element with a predetermined air gap therebetween. The stator 12 generates a magnetic field that rotates the rotor, when a current is applied thereto.

The stator core 14 is a hollow cylindrical member. A space 18 (a space on an inner diameter side) for accommodating the rotor is formed on the inner diameter side of the stator core 14. The stator core 14 may be formed by stacking in the axial direction a plurality of electromagnetic steel plates coated with an insulating material. A cylindrical yoke, which is made of compression molded soft magnetic powder coated with an insulating material, may be attached to the radially outer end surface of the stator core 14.

The stator core 14 has an annular back yoke 20 and teeth 22 extending radially inward (toward the central axis) from the radially inner end surface of the back yoke 20. A plurality of (e.g., 48) teeth 22 is provided in the circumferential direction with respect to the back yoke 20 so as to be arranged at regular intervals in the circumferential direction. Slots 24 each holding the rectangular wire concentric winding coils 10 are provided between two of the teeth 22 which adjoin each other in the circumferential direction. The slots 24 each open radially inward and extend radially outward. A width of each slot 24 in the circumferential direction is formed so as to become larger radially outward. The stator core 14 is configured such that a plurality of slots 24 extend radially from the central axis The stator core 14 is provided with lug portions 26 to attach and fix the stator 12 to a motor case. The lug portions 26 are formed in a mound shape projecting radially outward from the radially outer end surface (outer peripheral surface) of the body (specifically, the back yoke 20) of the stator core 14. A plurality of (e.g. three) lug portions 26 are provided away from each other in the circumferential direction. The lug portions 26 are provided with through holes 28 that penetrate in the axial direction. The stator 12 is fixed to the motor case with bolts fastened to the through holes 28 of the lug portions 26.

The rectangular wire concentric winding coils 10 are constituted of a rectangular wire formed in a rectangular shape (specifically, an oblong shape) in cross section. The rectangular wire is constituted of highly conductive metal such as copper or aluminum, for example. The corner portions, in cross section, of the rectangular wire may be rounded. A plurality of (e.g. 48) rectangular wire concentric winding coils 10 are disposed at the stator core 14 in the circumferential direction. Hereinafter, "edgewise bending" is referred to as bending the surface on shorter sides, in cross section, of the rectangular wire, and "flatwise bending" is referred to as bending the surface on long sides, in cross section, of the rectangular wire.

The rectangular wire concentric winding coils 10 are each formed such that a plurality of rectangular wires are stacked in the direction of the shorter side, in cross section, of the rectangular wires and there is a predetermined clearance between the rectangular wires adjoining each other in the stacking direction in which the rectangular wires are stacked. The rectangular wire concentric winding coils 10 are each formed to have a trapezoidal section such that the distance (i.e., the distance in the circumferential direction or the distance as viewed from the axial center) between two slot housed portions 30, 32 (refer to FIG. 4) in the circumferential direction varies according to the position in the stacking direction. The rectangular wire concentric winding coils 10 are each formed to have the trapezoidal section in order for the slot housed portions 30, 32 of the rectangular wire concentric winding coil 10 to be appropriately housed in the slots 24. The rectangular wire concentric winding coils 10 are each attached to the stator core 14 such that the stacking direction of the rectangular wires matches the radial direction that is perpendicular to the axial direction of the stator core 14. The attached state of the rectangular wire concentric winding coils 10 may be, for example, the attached state as disclosed in Japanese Patent Application Publication No. 2012-125043. For example, in the attached state of the rectangular wire concentric winding coils 10, in a certain slot 24, the slot housed portion 30 of one rectangular wire concentric winding coil 10 and the slot housed portion 32 of another rectangular wire concentric winding coil 10 are attached in a state in which each rectangular wire of the slot housed portion 32 of the other rectangular wire concentric winding coil 10 is sandwiched, in the radial direction, between each rectangular wire of the slot housed portion 30 of the one rectangular wire concentric winding coil 10.

Figure 2A:
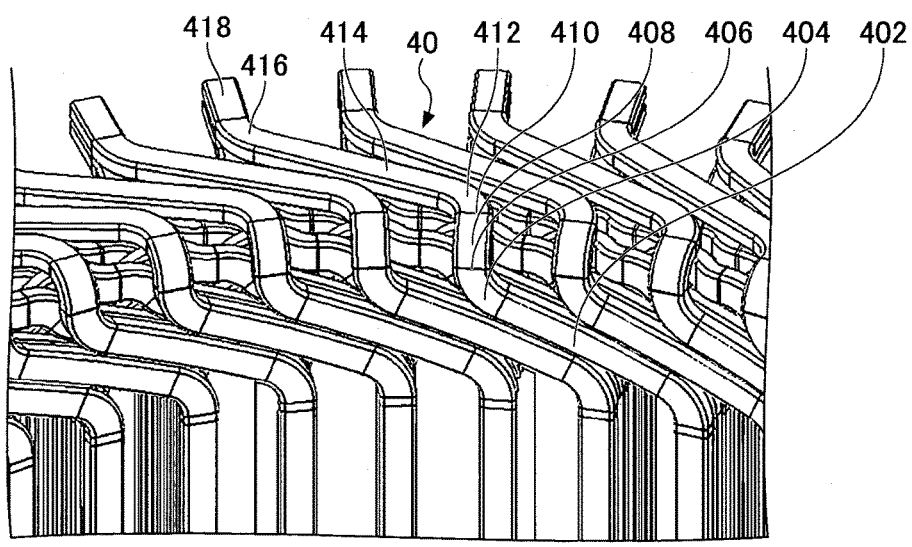
FIG. 2A is a perspective view of a part of a plurality of rectangular wire concentric winding coils in an attached state.
Figure 2B:
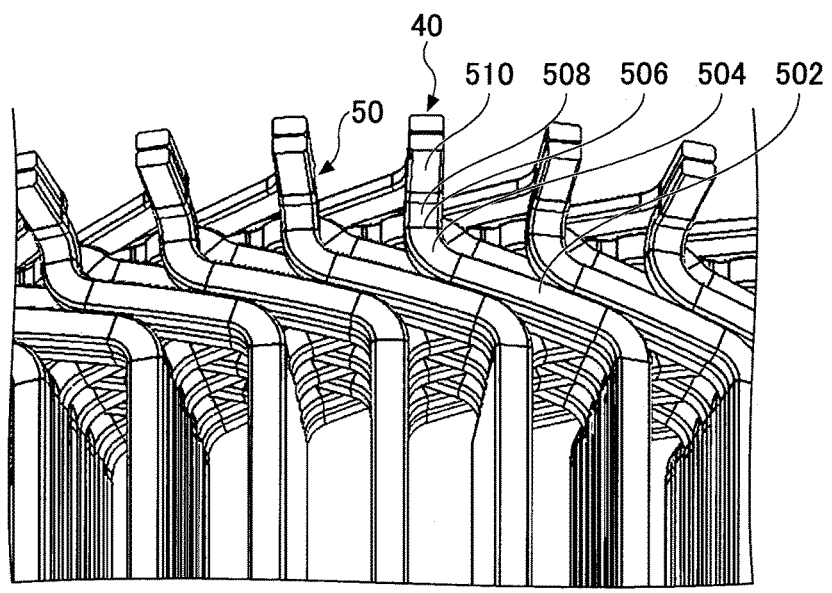
FIG. 2B is a perspective view of a part of a plurality of rectangular wire concentric winding coils in the attached state.
Figure 3:
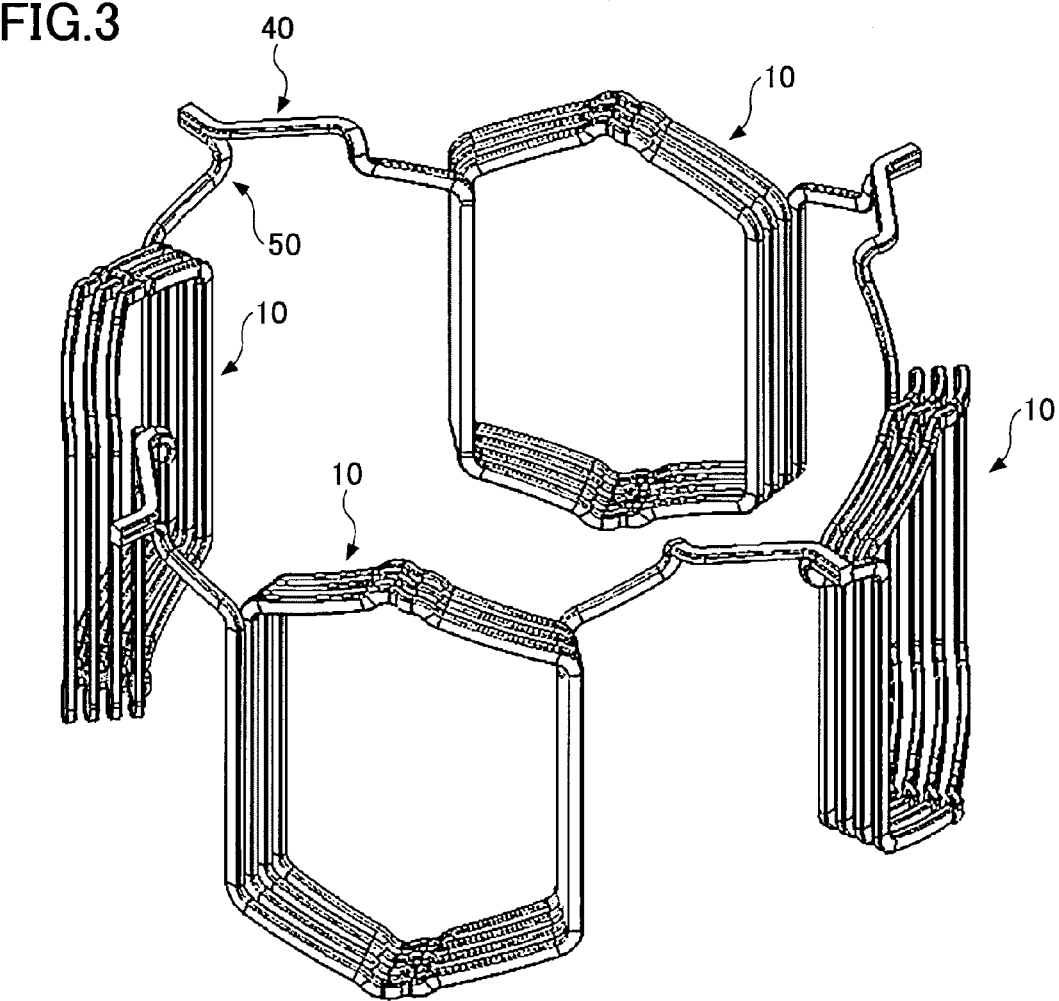
FIG. 3 is a perspective view of four rectangular wire concentric winding coils in the attached state.

FIGS. 2A and 2B are perspective views of a part of a plurality of rectangular wire concentric winding coils 10 in the attached state. FIG. 2A is a figure as viewed from a radially inner side and the axially outer side. FIG. 2B is a figure as viewed from the radially outer side and an axially inner side. FIG. 3 is a perspective view of four rectangular wire concentric winding coils 10 in the attached state. FIG. 4 is a perspective view of a single rectangular wire concentric winding coil 10. FIGS. 5A and 5B each show a single rectangular wire concentric winding coil 10. FIG. 5A is a top view as viewed in the axial direction and FIG. 5B is a front view. FIG. 6 is a developed view (a view given by virtually developing the circumferential direction in a linear manner) schematically illustrating relation between two rectangular wire concentric winding coils 10.

The rectangular wire concentric winding coils 10 are each a cassette coil shaped by bending a rectangular wire wound a plurality of turns (e.g. four turns). The rectangular wire concentric winding coils 10 are each shaped by a winding forming device by winding a single linear rectangular wire a predetermined plural number of turns while being formed into an elliptical shape, and thereafter by a shaping device by bending the winding into a generally hexagonal shape or a generally octagonal shape.

The rectangular wire concentric winding coils 10 each include, as shown in FIG. 4, the slot housed portions 30, 32, coil end portions 34, 36, radially inner side end portion 40, and radially outer side end portion 50. The slot housed portions 30, 32, and the coil end portions 34, 36 form a main body (closed loop portion) of the rectangular wire concentric winding coil 10. Configuration other than the radially inner side end portion 40 and the radially outer side end portion 50 may be arbitrary, which may be the configuration as disclosed by Japanese Patent Application Publication No. 2012-125043, for example.

The slot housed portions 30, 32 are portions to be inserted (housed) in the slots 24 of the stator core 14, and extend generally linearly so as to penetrate the slots 24 in the axial direction. The slot housed portion 30 and the slot housed portion 32 of the same and one rectangular wire concentric winding coil 10 are housed in different slots 24 located at a predetermined distance away from each other in the circumferential direction of the stator core 14.

The coil end portions 34, 36 are portions that are connected with the slot housed portions 30, 32 and that link the two slot housed portions 30, 32 projecting axially outward from the axially end surface of the stator core 14 and located away from each other in the circumferential direction.

The coil end portion 36 (the coil end portion on a side where the radially inner side end portion 40 and the radially outer side end portion 50 are formed) includes, as shown in FIG. 5B, a top portion 361 and oblique portions 362, 363. The oblique portions 362, 363 are formed from both sides, in the circumferential direction, of the top portion 361 and each extend toward the slot housed portions 30, 32 so as to be inclined inward in the axial direction. The oblique portion 362, as shown in FIG. 5B, is inclined by an inclination angle of α1 (an inclination angle α1 with respect to the end surface of the stator core 14 in the example shown in FIG. 5B) with respect to the stator core 14. The oblique portion 363, as shown in FIG. 5B, are inclined by an inclination angle of α2 (an inclination angle α2 with respect to the end surface of the stator core 14 in the example shown in FIG. 5B) with respect to the stator core 14. The inclination angles α1, α2 are for example the same, or may be different.

In the example shown in FIG. 5B, the oblique portions 362, 363 are linear portions extending linearly. However, the oblique portions 362, 363 may extend in oblique directions as a whole in a stepped manner including edgewise bent portions. In such a case, the inclination angles α1, α2 may be inclination angles for the portions extending in oblique directions. The same applies to inclination angles β1, β2 which are described later. In addition, the inclination angle α1 of the oblique portion 362 (the same applies to the oblique portion 363) may be an angle of a straight line connecting positions on both ends of the oblique portion 362 with respect to the end surface of the stator core 14. The same applies to the angles β1, β2 which are described later, in the same manner.

The radially inner side end portion 40 and the radially outer side end portion 50 link the slot housed portion 30, 32 of two rectangular wire concentric winding coils 10 located away from each other in the circumferential direction. In the example shown in FIG. 3, four rectangular wire concentric winding coils 10 located away from each other by an angle of 90 degrees in the circumferential direction are connected with each other in a manner such that the radially inner side end portion 40 of one rectangular wire concentric winding coil 10 is bonded to the radially outer side end portion 50 of another rectangular wire concentric winding coil 10 that adjoins the one rectangular wire concentric winding coil 10. The bonding may be realized by welding.

Hereinafter, for convenience of explanation, focusing on two rectangular wire concentric winding coils 10 connected in such a manner, one is referred to as a first rectangular wire concentric winding coil 101 and the other one is referred to as a second rectangular wire concentric winding coil 102. In addition, hereinafter, the radially inner side end portion 40 of the first rectangular wire concentric winding coil 101 is bonded to the radially outer side end portion 50 of the second rectangular wire concentric winding coil 102. Further, hereinafter, in the explanation for the structure of the first rectangular wire concentric winding coil 101, a side toward the second rectangular wire concentric winding coil 102 in the circumferential direction is referred to as a circumferentially outer side. In the explanation for the structure of the second rectangular wire concentric winding coil 102, a side toward the first rectangular wire concentric winding coil 101 in the circumferential direction is referred to as a circumferentially outer side.

The bonding position between the radially inner side end portion 40 of the first rectangular wire concentric winding coil 101 and the radially outer side end portion 50 of the second rectangular wire concentric winding coil 102 is located, in the radial direction, on the radially outer side of the center in the radial direction of the slots 24 of the stator core 14, as shown in FIG. 2A and FIG. 2B. The bonding position between the radially inner side end portion 40 of the first rectangular wire concentric winding coil 101 and the radially outer side end portion 50 of the second rectangular wire concentric winding coil 102 is located, in the circumferential direction, closer to the main body of the second rectangular wire concentric winding coil 102 than the main body of the first rectangular wire concentric winding coil 101, as shown in FIG. 6.

The radially inner side end portion 40 includes a first oblique portion 402, a first edgewise bent portion 404, a first linear portion 406, a first flatwise bent portion 408, a second linear portion 410, a second edgewise bent portion 412, a third linear portion 414, a third edgewise bent portion 416, and a fourth linear portion 418, as shown in FIG. 4.

The first oblique portion 402 protrudes from the radially inner side of the slot 24 of the stator core 14 and extends in an oblique direction toward the circumferentially outer side and an axially outer side. The first oblique portion 402 is formed from an end portion 302 of the slot housed portion 30. The end portion 302 of the slot housed portion 30 is formed by edgewise-bending a portion of the slot housed portion 30 extending axially outward toward the circumferentially outer side. In the example shown in FIG. 4, the first oblique portion 402 is a linear portion extending linearly. However, the first oblique portion 402 may extend in the oblique direction as a whole in a stepwise manner including an edgewise bending portion. The end portion 302 of the slot housed portion 30 may be recognized as a part of the radially inner side end portion 40.

In the first oblique portion 402, as schematically shown in FIG. 6, the inclination angle β1 (the inclination angle β1 with respect to the end surface of the stator core 14) with respect to the stator core 14 is made the same as the inclination angle α1 of the oblique portion 362. Thereby, a height of an end portion of the first oblique portion 402 on the axially outer side from the end surface of the stator core 14 can be minimized and the enlargement in the size of the stator 12 in the axial direction can be reduced. In the example shown in FIG. 6, the inclination angle β1 of the first oblique portion 402 as a whole is made the same as the inclination angle α1. However, the inclination angle β1 may be made, only in a part of the first oblique portion 402, the same as the inclination angle α1. That is, the first oblique portion 402 may be formed in a manner including a plurality of inclination angles β1 and the inclination angle β1 of a part of the first oblique portion 402 may be made the same as the inclination angle α1.

The first edgewise bent portion 404 is formed by edgewise-bending from the first oblique portion 402 toward the axially outer side.

The first linear portion 406 extends from the first edgewise bent portion 404 toward the axially outer side. The first linear portion 406 extends preferably parallel to the axial direction. The length of the first linear portion 406 may be very short. As shown in FIG. 4, the length of the first linear portion 406 may be substantially zero.

The first flatwise bent portion 408 is formed by flatwise-bending from the first linear portion 406 toward the radially outer side.

The second linear portion 410 extends from the first flatwise bent portion 408 toward the radially outer side. The second linear portion 410 is not necessary to be parallel to the radial direction. For example, the second linear portion 410 may extend toward the radially outer side and circumferentially outer side. The length of the second linear portion 410 may be very short. As shown in FIG. 4, the length of the second linear portion 410 may be substantially zero.

The second edgewise bent portion 412 is formed by edgewise-bending from the second linear portion 410 toward the circumferentially outer side.

The third linear portion 414 extends from the second edgewise bent portion 412 toward the circumferential outer side and the radially outer side in an oblique direction.

The third edgewise bent portion 416 is formed by edgewise-bending from the third linear portion 414 toward the radially outer side.

The fourth linear portion 418 extends from the third edgewise bent portion 416 toward the radially outer side. The fourth linear portion 418 is not necessary to be parallel to the radial direction. For example, the fourth linear portion 418 may extend toward the radially outer side and the circumferentially outer side.

As shown in FIG. 5B, the second linear portion 410, the second edgewise bent portion 412, the third linear portion 414, the third edgewise bent portion 416, and the fourth linear portion 418 extend on a plane (plane of the bonding portion) substantially parallel to the end surface of the stator core 14. In other words, the first oblique portion 402, the first edgewise bent portion 404, the first linear portion 406, and the first flatwise bent portion 408 extend by a predetermined height (a height to the bonding portion) in the axial direction. The predetermined height may correspond substantially to the length of extension of the coil end portion 36 in the axial direction. In addition, as shown in FIG. 5A, the second linear portion 410, the second edgewise bent portion 412, the third linear portion 414, and the fourth linear portion 418 extend by a predetermined length (a length to the bonding portion) in the radial direction. The predetermined length may correspond substantially to a width of the coil end portion 36 in the radial direction.

In addition, as shown in FIG. 6, of the radially inner side end portion 40 of the first rectangular wire concentric winding coil 101, at least the first edgewise bent portion 404, the first linear portion 406, and the first flatwise bent portion 408 (refer to FIG. 4) are positioned on a side closer to the main body of the first rectangular wire concentric winding coil 101 of a circumferential-direction center Ct between the slot housed portion 30 of the first rectangular wire concentric winding coil 101 and the slot housed portion 32 of the second rectangular wire concentric winding coil 102. Thereby, the end portion of the radially inner side end portion 40 of the first rectangular wire concentric winding coil 101 extends from the first oblique portion 402 in the axial direction on the side closer to the main body of the first rectangular wire concentric winding coil 101 of the circumferential-direction center Ct.

The radially outer side end portion 50 includes a second oblique portion 502, a fourth edgewise bent portion 504, a fifth linear portion 506, a second flatwise bent portion 508, and a sixth linear portion 510.

The second oblique portion 502 protrudes from the radially outer side of the slot 24 of the stator core 14 and extends in an oblique direction toward the circumferentially outer side and the axially outer side. The second oblique portion 502 is formed from an end portion 322 of the slot housed portion 32. The end portion 322 of the slot housed portion 32 is formed by edgewise-bending a portion of the slot housed portion 32 extending axially outward toward the circumferentially outer side. In the example shown in FIG. 4, the second oblique portion 502 is a linear portion extending linearly. However, the second oblique portion 502 may extend in the oblique direction as a whole in a stepwise manner including edgewise bending portions. The end portion 322 of the slot housed portion 32 may be recognized as a part of the radially outer side end portion 50.

In the second oblique portion 502, as schematically shown in FIG. 6, an inclination angle β2 (the inclination angle β2 with respect to the end surface of the stator core 14) with respect to the stator core 14 is made the same as an inclination angle α2 of the oblique portion 363. Thereby, a height of an end portion of the second oblique portion 502 on the axially outer side from the end surface of the stator core 14 can be minimized and the enlargement in the size of the stator 12 in the axial direction can be reduced. In the example shown in FIG. 6, the inclination angle β2 of the second oblique portion 502 as a whole is made the same as the inclination angle α2. However, the inclination angle β2 may be made, only in a part of the second oblique portion 502, the same as the inclination angle α2. That is, the second oblique portion 502 may be formed in a manner including a plurality of inclination angles β2 and the inclination angle β2 of a part of the second oblique portion 502 may be made the same as the inclination angle α2.

The fourth edgewise bent portion 504 is formed by edgewise-bending from the second oblique portion 502 toward the axially outer side.

The fifth linear portion 506 extends from the fourth edgewise bent portion 504 toward the axially outer side. The fifth linear portion 506 extends preferably parallel to the axial direction. The length of the fifth linear portion 506 may be very short. As shown in FIG. 4, the length of the fifth linear portion 506 may be substantially zero.

The second flatwise bent portion 508 is formed by flatwise-bending from the fifth linear portion 506 toward the radially outer side.

The sixth linear portion 510 extends from the second flatwise bent portion 508 toward the radially outer side. The sixth linear portion 510 is bonded to the fourth linear portion 418 of the radially inner side end portion 40. The sixth linear portion 510 is not necessary to be parallel to the radial direction. For example, the sixth linear portion 510 may extend toward the radially outer side and circumferentially outer side. However, the sixth linear portion 510 and the fourth linear portion 418 are formed so as to extend in the same direction in the attached state because these are bonded to each other.

As shown in FIG. 5B, the sixth linear portion 510 extends on the plane (plane of the bonding portion) substantially parallel to the end surface of the stator core 14. In other words, the second oblique portion 502, the fourth edgewise bent portion 504, the fifth linear portion 506, and the second flatwise bent portion 508 extend by a predetermined height (the height to the bonding portion) in the axial direction. The predetermined height may correspond substantially to the length of the extension of the coil end portion 36 in the axial direction. The sixth linear portion 510 may extend at a height lower than an extending surface of the fourth linear portion 418 by a thickness of the fourth linear portion 418 so as to overlap the fourth linear portion 418 in the axial direction. In addition, as shown in FIG. 5A, the sixth linear portion 510 extends by a predetermined length (the length to the bonding portion) in the radial direction.

In addition, as shown in FIG. 6, of the radially outer side end portion 50 of the second rectangular wire concentric winding coil 102, at least the fourth edgewise bent portion 504, the fifth linear portion 506, and the second flatwise bent portion 508 are positioned on a side closer to the main body of the second rectangular wire concentric winding coil 102 of the circumferential-direction center Ct between the slot housed portion 30 of the first rectangular wire concentric winding coil 101 and the slot housed portion 32 of the second rectangular wire concentric winding coil 102. Thereby, the radially outer side end portion 50 of the second rectangular wire concentric winding coil 102 extends from the second oblique portion 502 in the axial direction on the side closer to the main body of the second rectangular wire concentric winding coil 102 of the circumferential-direction center Ct.

According to the examples shown in FIGS. 1 to 6, both the radially inner side end portion 40 and the radially outer side end portion 50 do not include combined bent portions of flatwise-bending and edgewise-bending. Specifically, in the radially inner side end portion 40, the first flatwise bent portion 408 is connected to the first edgewise bent portion 404 by the first linear portion 406 and connected to the second edgewise bent portion 412 by the second linear portion 410. In addition, in the radially outer side end portion 50, the second flatwise bent portion 508 is connected to the fourth edgewise bent portion 504 by the fifth linear portion 506. Thereby, the damage to coil coating due to the combined bending of flatwise-bending and edgewise-bending can be reduced.

In the examples shown in FIGS. 1 to 6, as mentioned above, the bonding position between the radially inner side end portion 40 of the first rectangular wire concentric winding coil 101 and the radially outer side end portion 50 of the second rectangular wire concentric winding coil 102 is closer to the main body of the second rectangular wire concentric winding coil 102 than the main body of the first rectangular wire concentric winding coil 101 in the circumferential direction. Thereby, compared to an example that the bonding position between the radially inner side end portion 40 of the first rectangular wire concentric winding coil 101 and the radially outer side end portion 50 of the second rectangular wire concentric winding coil 102 is located at the intermediate position between the main body of the first rectangular wire concentric winding coil 101 and the main body of the second rectangular wire concentric winding coil 102 in the circumferential direction, the length of the radially inner side end portion 40 in the circumferential direction can be enlarged. More specifically, in the radially inner side end portion 40, while making the length of the first oblique portion 402 substantially the same as the length of the second oblique portion 502 of the radially outer side end portion 50 in the circumferential direction, the formation of the second edgewise bent portion 412 through the second linear portion 410 becomes easy. In addition, compared to the example, the third linear portion 414 can be enlarged. Therefore, the formation of the third edgewise bent portion 416 becomes easy. Besides, in the radially outer side end portion 50, it is not necessary to form the structure corresponding to the second edgewise bent portion 412, the third linear portion 414, the third edgewise bent portion 416, and the fourth linear portion 418 in the radially inner side end portion 40. As a result, as mentioned above, the necessity of the combined bending of flatwise-bending and edgewise-bending can be eliminated.

Subsequently, with reference to FIGS. 7A to 11, rectangular wire concentric winding coils 10A according to another example is explained. The rectangular wire concentric winding coils 10A can be attached to the stator core 14 in the same manner as the rectangular wire concentric winding coils 10 according to the aforementioned example.

Figure 7A:
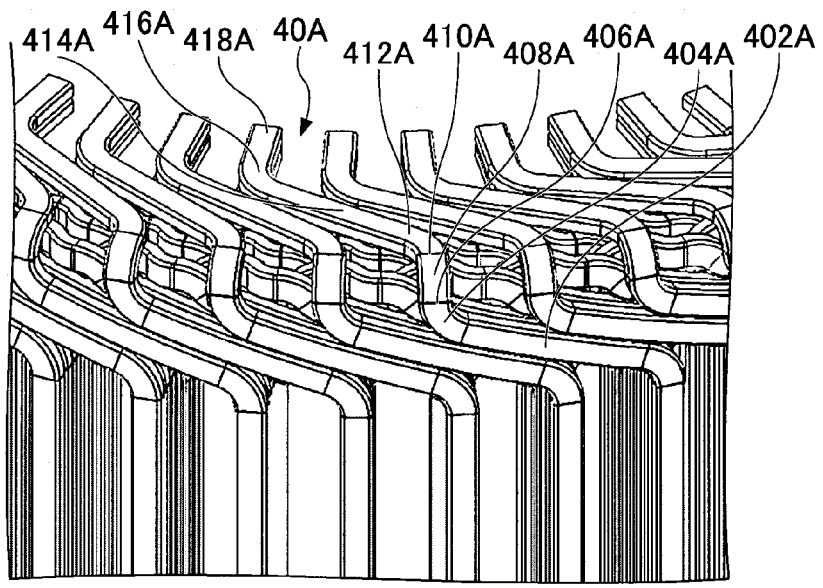
FIG. 7A is a perspective view of a part of a plurality of rectangular wire concentric winding coils in the attached state.
Figure 7B:
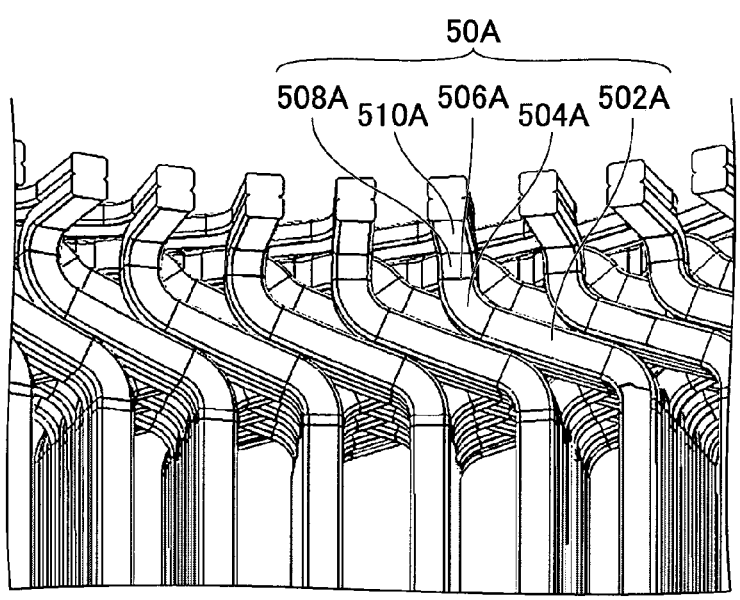
FIG. 7B is a perspective view of a part of a plurality of rectangular wire concentric winding coils in the attached state.
Figure 8:
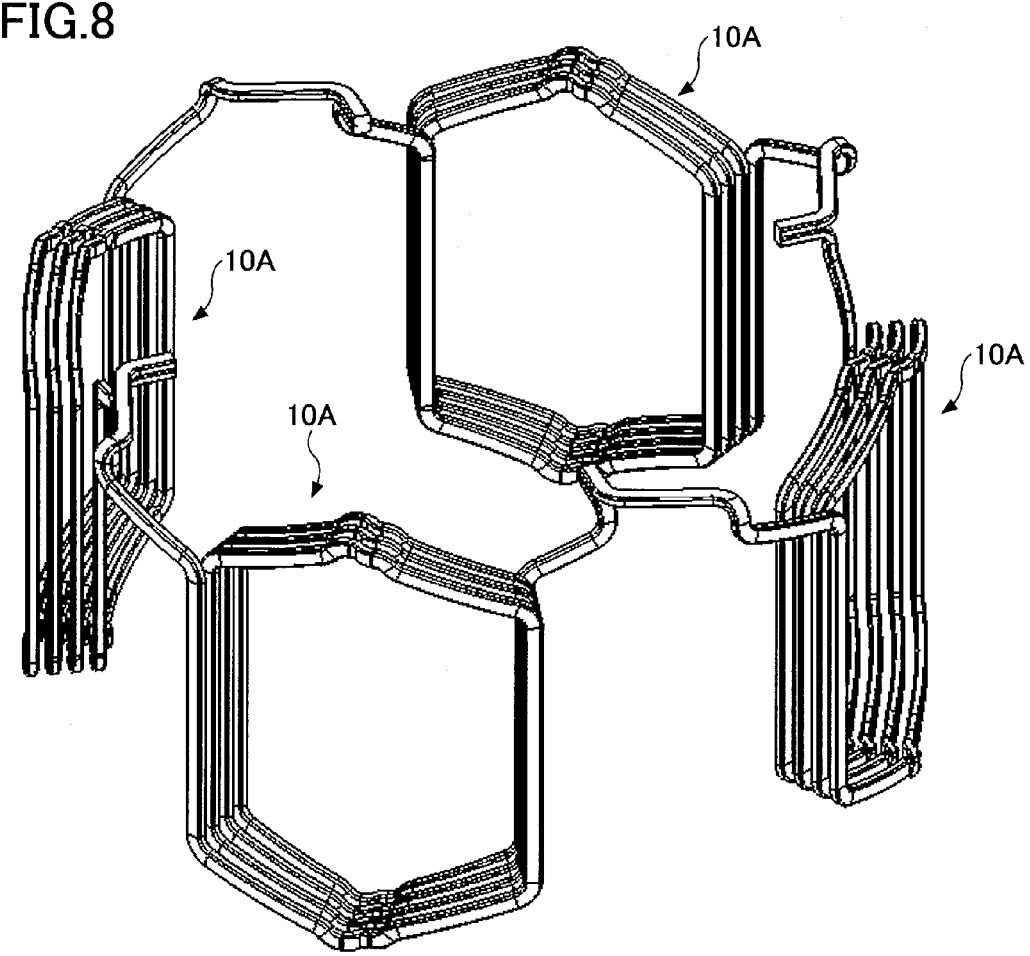
FIG. 8 is a perspective view of four rectangular wire concentric winding coils in the attached state.
Figure 9:
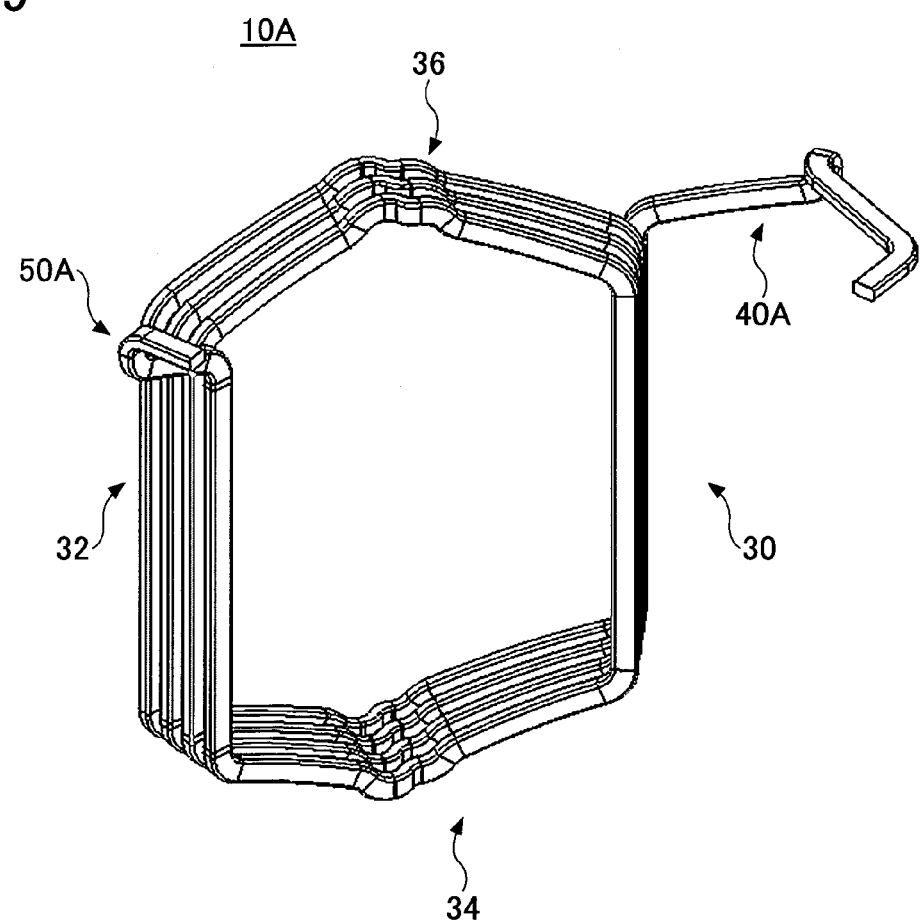
FIG. 9 is a perspective view of a single rectangular wire concentric winding coil.
Figure 10A:
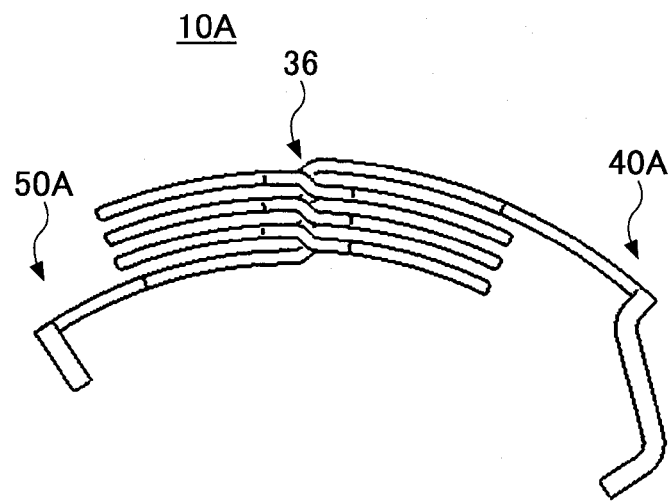
FIG. 10A shows a single rectangular wire concentric winding coil.
Figure 10B:
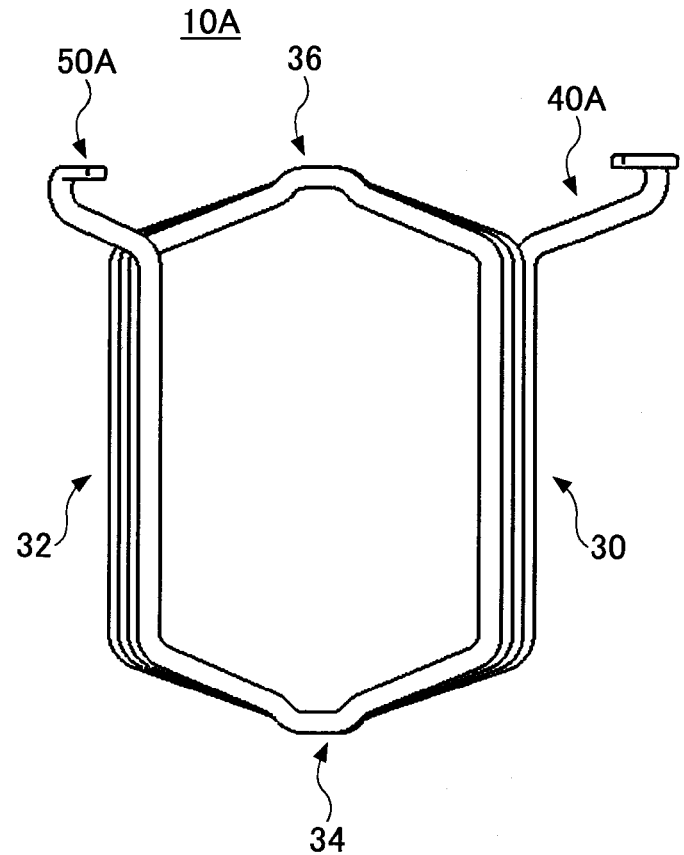
FIG. 10B shows a single rectangular wire concentric winding coil.

FIGS. 7A and 7B are perspective views of a part of a plurality of rectangular wire concentric winding coils 10A in the attached state. FIG. 7A is a view from the radially outer side and the axially outer side and FIG. 7B is a view from the radially inner side and the axially inner side. FIG. 8 is a perspective view of four rectangular wire concentric winding coils 10A in the attached state. FIG. 9 is a perspective view of a single rectangular wire concentric winding coil 10A. FIGS. 10A and 10B each show a single rectangular wire concentric winding coil 10A. FIG. 10A is a top plan as viewed from the axial direction and FIG. 10B is a front view. FIG. 11 is a developed view (a view given by virtually developing the circumferential direction in a linear manner) schematically illustrating relation between two rectangular wire concentric winding coils 10A.

The rectangular wire concentric winding coils 10A differ from the rectangular wire concentric winding coils 10 shown in FIGS. 2A to 6 mainly in an aspect that the bonding portion between the corresponding two rectangular wire concentric winding coils 10A is located radially inward, as shown in FIGS. 7A to 11. In FIGS. 7A to 11, same reference signs are assigned for constituent elements which may be the same as those of the rectangular wire concentric winding coils 10.

The rectangular wire concentric winding coils 10A each include, as shown in FIG. 9, the slot housed portions 30, 32, the coil end portions 34, 36, a radially outer side end portion 40A, and a radially inner side end portion 50A.

Hereinafter, for convenience of explanation, focusing on two rectangular wire concentric winding coils 10A connected in such a manner, one is referred to as a first rectangular wire concentric winding coil 101A, and the other one is referred to as a second rectangular wire concentric winding coil 102A. In addition, hereinafter, the radially outer side end portion 40A of the first rectangular wire concentric winding coil 101A is bonded to the radially inner side end portion 50A of the second rectangular wire concentric winding coil 102A. Further, hereinafter, in the explanation for the structure of the first rectangular wire concentric winding coil 101A, the side toward the second rectangular wire concentric winding coil 102A in the circumferential direction is referred to as the circumferentially outer side. In the explanation for the structure of the second rectangular wire concentric winding coil 102A, the side toward the first rectangular wire concentric winding coil 101A in the circumferential direction is referred to as the circumferentially outer side.

The bonding position between the radially outer side end portion 40A of the first rectangular wire concentric winding coil 101A and the radially inner side end portion 50A of the second rectangular wire concentric winding coil 102A is located, in the radial direction, on the radially inner side of the center in the radial direction of the slots 24 of the stator core 14, as shown in FIG. 7A and FIG. 7B. The bonding position between the radially outer side end portion 40A of the first rectangular wire concentric winding coil 101A and the radially inner side end portion 50A of the second rectangular wire concentric winding coil 102A is located, in the circumferential direction, closer to the main body of the second rectangular wire concentric winding coil 102A than the main body of the first rectangular wire concentric winding coil 101A, as shown in FIG. 11.

The radially outer side end portion 40A includes a first oblique portion 402A, a first edgewise bent portion 404A, a first linear portion 406A, a first flatwise bent portion 408A, a second linear portion 410A, a second edgewise bent portion 412A, a third linear portion 414A, a third edgewise bent portion 416A, and a fourth linear portion 418A, as shown in FIGS. 7A and 7B. The constituent elements 402A to 418A of the radially outer side end portion 40A are formed symmetrical, in the radial direction, to the constituent elements (402 to 418) of the radially inner side end portion 40 of the rectangular wire concentric winding coil 10 shown in FIGS. 2A to 6. In other aspects, the constituent elements 402A to 418A of the radially outer side end portion 40A are substantially the same as the constituent elements (402 to 418) of the radially inner side end portion 40. In case of the radially outer side end portion 40A, "radially outer side" and "radially inner side" in the explanation for the structure of the radially inner side end portion 40 of the rectangular wire concentric winding coil 10 shown in FIGS. 2A to 6 may be read as "radially inner side" and "radially outer side," respectively.

The radially inner side end portion 50A includes a second oblique portion 502A, a fourth edgewise bent portion 504A, a fifth linear portion 506A, a second flatwise bent portion 508A, and a sixth linear portion 510A, as shown in FIGS. 7A and 7B. The constituent elements 502A to 510A of the radially inner side end portion 50A are formed symmetrical, in the radial direction, to the constituent elements (502 to 510) of the radially outer side end portion 50 of the rectangular wire concentric winding coil 10 shown in FIGS. 2A to 6. In other aspects, the constituent elements 502A to 510A of the radially inner side end portion 50A are substantially the same as the constituent elements (502 to 510) of the radially outer side end portion 50. In case of the radially inner side end portion 50A, "radially outer side" and "radially inner side" in the explanation for the structure of the radially outer side end portion 50 of the rectangular wire concentric winding coil 10 shown in FIGS. 2A to 6 may be read as "radially inner side" and "radially outer side," respectively.

The effects obtained with the rectangular wire concentric winding coil 10 shown in FIGS. 2A to 6 can be also obtained with the rectangular wire concentric winding coil 10A shown in FIGS. 7A to 11 in the same manner.

While embodiments have been described above, it is a matter of course that the present disclosure is not limited to specific embodiments in any way, and that the present disclosure may be modified or changed in various ways without departing from the spirit of the disclosure. All of or some of the constituent elements of the embodiments described above may be combined.

For example, in the embodiments described above, the radially outer side end portion 50 of the second rectangular wire concentric winding coil 102 (same in the second rectangular wire concentric winding coil 102A) includes the second oblique portion 502. However, as shown in FIG. 12, the radially outer side end portion 50 of the second rectangular wire concentric winding coil 102 may not include the second oblique portion 502 and may extend directly in the axial direction. FIG. 12 shows a rectangular wire concentric winding coil 10B according to a modification example. The rectangular wire concentric winding coil 10B differs from the aforementioned rectangular wire concentric winding coil 10 in an aspect that the radially inner side end portion 40 is replaced with a radially inner side end portion 40B and the radially outer side end portion 50 is replaced with a radially outer side end portion 50. The radially inner side end portion 40B differs from the aforementioned radially inner side end portion 40 in an aspect that the third linear portion 414 is replaced with a third linear portion 414B. The third linear portion 414B differs from the third linear portion 414 in an aspect that the length is longer and the inclination direction (inclination toward radially outer side) is gentle by the increase in length. The radially outer side end portion 50 differs from the aforementioned radially outer side end portion 50 in an aspect that the second oblique portion 502, the fourth edgewise bent portion 504, and the fifth linear portion 506 are not provided and the end portion 322, the second flatwise bent portion 508, and the sixth linear portion 510 are replaced with an end portion 322B, a second flatwise bent portion 508B, and a sixth linear portion 510B, respectively. The end portion 322B is not formed by winding but a portion that extends linearly on the radially outer side of the slot housed portion 32, unlike the end portion 322. The second flatwise bent portion 508B differs from the aforementioned second flatwise bent portion 508 in an aspect that the second flatwise bent portion 508B is connected to the end portion 322B. Thereby, the sixth linear portion 510B differs from the aforementioned sixth linear portion 510 in the position in the circumferential direction. Even with such a modification example, the same effects can be obtained as the aforementioned embodiment. In addition, for example, in the aforementioned embodiment, although the explanation has been given with the rectangular wire concentric winding coil, the coil may be a continuous coil with wave winding. The continuous coil is a coil in which a plurality of slot housed portions to be housed in different slots, coil end portions connecting slot housed portions on one side in the axial direction of the stator core, and coil end portions connecting slot housed portions on the other side in the axial direction of the stator core are formed continuously with the same lead wire (rectangular wire).

Relating to the embodiments above, the following is further disclosed.

[1]

A stator 12 includes:

an annular stator core 14 having a plurality of slots 24; and when an axial direction, a radial direction, and a circumferential direction are defined using the stator core 14 as a reference, one of a radially outer side and a radially inner side is a radially first side, and the other of the radially outer side and the radially inner side is a radially second side, a plurality of coils (10, 10A) attached to the stator core 14, the plurality of coils (10, 10A) each including a main body that is inserted in the plurality of slots 24 and includes two slot housed portions 30, 32 and coil end portions 34, 36 including oblique portions 362, 363 extending obliquely with respect to the axial direction, a radially first side end portion (40, 40A) formed from one of the slot housed portions 30, 32, and a radially second side end portion (50, 50A) formed from the other one of the slot housed portions 30, 32, wherein the plurality of coils (10, 10A) includes a first coil 101, 101A and a second coil 102, 102A that is housed in a slot 24 located away, in the circumferential direction, from a slot 24 in which the first coil 101, 101A is housed and that is provided with the radially second side end portion (50, 50A) bonded to the radially first side end portion (40, 40A) of the first coil 101, 101A, and the radially first side end portion (40, 40A) includes a first oblique portion 402 extending obliquely with respect to the axial direction and an end portion (414) extending toward the second coil in the radial direction and the circumferential direction.

According to the configuration described in [1], the end portion (414) extending toward the second coil in the radial direction and the circumferential direction is included. Therefore, it is possible to reduce damage to the coil coating due to the combined bending of flatwise-bending and edgewise-bending while reducing the enlargement in the size of the stator in the axial direction due to the radially first side end portion (40, 40A).

[2]

The stator described in [1], wherein a bonding position between the radially first side end portion (40, 40A) of the first coil 101, 101A and the radially second side end portion (50, 50A) of the second coil 102, 102A is located, in the radial direction, on the radially second side of a center in the radial direction of the slots 24 of the stator core 14 and is closer, in the circumferential direction, to the main body of the second coil 102, 102A than the main body of the first coil 101, 101A.

According to the configuration described in [2], the bonding position between the radially first side end portion (40, 40A) of the first coil 101, 101A and the radially second side end portion (50, 50A) of the second coil 102, 102A is located, in the radial direction, on the radially second side of the center in the radial direction of the slots 24 of the stator core 14 and is closer, in the circumferential direction, to the main body of the second coil 102, 102A than the main body of the first coil 101, 101A. Therefore, the radially first side end portion (40, 40A) can be easily formed without necessity of forming the combined bending of flatwise-bending and edgewise-bending.

[3]

The stator described in [1] or [2], wherein an inclination angle of at least a part of the first oblique portion of the radially first side end portion with respect to the stator core is made a same as an inclination angle of at least a part of the oblique portions of the main body with respect to the stator core.

According to the configuration described in [3], the inclination angle of at least a part of the first oblique portion 402 of the radially first side end portion (40, 40A) with respect to the stator core 14 is made the same as the inclination angle of at least a part of the oblique portions 362 of the main body with respect to the stator core 14. Therefore, the enlargement in the size of the stator in the axial direction due to the radially first side end portion (40, 40A) can be reduced.

[4]

The stator 12, wherein the radially second side end portion (50, 50A) includes a second oblique portion 502 extending obliquely with respect to the axial direction, an inclination angle of at least a part of the second oblique portion 502 of the radially second side end portion (50, 50A) with respect to the stator core 14 is made a same as an inclination angle of at least a part of the oblique portions 363 of the main body of the second coil 102, 102A with respect to the stator core 14, and the radially second side end portion (50, 50A) includes an end portion extending from the second oblique portion 502 in the axial direction on a side closer to the main body of the second coil 102, 102A of the center in the circumferential direction between a slot housed portion 30 closer to the second coil 102, 102A between the slot housed portions 30, 32 of the first coil 101, 101A and a slot housed portion 32 closer to the first coil 101, 101A between the slot housed portions 30, 32 of the second coil 102, 102A.

According to the configuration described in [4], the inclination angle of at least a part of the second oblique portion 502 of the radially second side end portion (50, 50A) with respect to the stator core 14 is made the same as the inclination angle of at least a part of the oblique portions 363 of the main body of the second rectangular wire concentric winding coil 102, 102A with respect to the stator core 14. Therefore, the enlargement in the size of the stator in the axial direction due to the radially second side end portion (50, 50A) can be reduced. In addition, the radially second side end portion (50, 50A) includes the end portion extending from the second oblique portion 502 in the axial direction on the side closer to the main body of the second rectangular wire concentric winding coil 102, 102A of the aforementioned center in the circumferential direction. Therefore, the radially second side end portion (50, 50A) can be easily formed without necessity of forming the combined bending of flatwise-bending and edgewise-bending. Thereby, it is possible to reduce damage to the coil coating due to the combined bending of flatwise-bending and edgewise-bending while reducing the enlargement in the size of the stator in the axial direction due to the radially second side end portion (50, 50A).

[5]

The stator 12, wherein the end portion of the radially first side end portion (40, 40A) extends from the first oblique portion 402 in the axial direction on a side closer to the main body of the first coil 101, 101A of the center in the circumferential direction between a slot housed portion 30 closer to the second coil 102, 102A between the slot housed portions 30, 32 of the first coil 101, 101A and a slot housed portion 32 closer to the first coil 101, 101A between the slot housed portions 30, 32 of the second coil 102, 102A.

According to the configuration described in [5], the end portion of the radially first side end portion (40, 40A) extends from the first oblique portion 402 in the axial direction on the side closer to the main body of the first coil 101, 101A of the aforementioned center in the circumferential direction. Therefore, the radially first side end portion (40, 40A) can be easily formed without necessity of forming the combined bending of flatwise-bending and edgewise-bending. Thereby, it is possible to reduce damage to the coil coating due to the combined bending of flatwise-bending and edgewise-bending while reducing the enlargement in the size of the stator in the axial direction due to the radially first side end portion (40, 40A).

[6]

The stator 12, wherein the plurality of coils 10, 10A are formed by a coil wire having a rectangular cross-section, when a side toward the second coil 102, 102A is a circumferentially outer side and a side far from a center in the axial direction of the stator core 14 is an axially outer side, the first oblique portion 402 protrudes from the radially first side inside a slot 24 of the stator core 14 and extends toward the circumferentially outer side and the axially outer side in an oblique direction, and the end portion of the radially first side end portion (40, 40A) of the first coil 101, 101A further includes a first edgewise bent portion 404 formed by edgewise-bending from the first oblique portion 402 toward the axially outer side, a first linear portion 406 extending from the first edgewise bent portion 404 toward the axially outer side, a first flatwise bent portion 408 formed by flatwise-bending from the first linear portion 406 toward the radially second side, a second linear portion 410 extending from the first flatwise bent portion 408 toward the radially second side, a second edgewise bent portion 412 formed by edgewise-bending from the second linear portion 410 toward the circumferentially outer side, a third linear portion 414 extending from the second edgewise bent portion 412 toward the circumferential outer side and the radially second side in the oblique direction, a third edgewise bent portion 416 formed by edgewise-bending from the third linear portion 414 toward the radially second side, and a fourth linear portion 418 extending from the third edgewise bent portion 416 toward the radially second side.

According to the configuration described in [6], the radially first side end portion (40, 40A) can be easily formed without necessity of forming the combined bending of flatwise-bending and edgewise-bending. Thereby, it is possible to reduce damage to the coil coating due to the combined bending of flatwise-bending and edgewise-bending.

[7]

When a side toward the first coil 101, 101A is a circumferentially outer side and a side far from a center in the axial direction of the stator core 14 is an axially outer side, the second oblique portion 502 protrudes from the radially second side inside a slot 24 of the stator core 14 and extends toward the circumferentially outer side and the axially outer side in an oblique direction, and the end portion of the radially second side end portion (50, 50A) of the second coil 102, 102A further includes a fourth edgewise bent portion 504 formed by edgewise-bending from the second oblique portion 502 toward the axially outer side, a fifth linear portion 506 extending from the fourth edgewise bent portion 504 toward the axially outer side, a second flatwise bent portion 508 formed by flatwise-bending from the fifth linear portion 506 toward the radially second side, and a sixth linear portion 510 extending from the second flatwise bent portion 508 toward the radially second side and is bonded to a fourth linear portion 418 of the radially first side end portion (40, 40A) of the first coil 101, 101A.

According to the configuration described in [7], the radially second side end portion (50, 50A) can be easily formed without necessity of forming the combined bending of flatwise-bending and edgewise-bending. Thereby, it is possible to reduce damage to the coil coating due to the combined bending of flatwise-bending and edgewise-bending.

[8]

The stator, wherein the end portion (414) of the radially first side end portion extending toward the second coil in the radial direction and the circumferential direction is disposed so as to be parallel to an end surface of the stator core 14.

According to the configuration described in [8], the end portion (414) of the radially first side end portion extending toward the second coil in the radial direction and the circumferential direction is disposed so as to be parallel to the end surface of the stator core 14. Therefore, it is possible to reduce the expansion of the radially first side end portion (40, 40A) in the axial direction.

The present international application claims priority to Japanese Patent Application No. 2014-190453, filed Sep. 18, 2014, the entire contents of which are incorporated by reference herein.

The invention claimed is:

1. A stator comprising:
   an annular stator core having a plurality of slots, wherein an axial direction, a radial direction, and a circumferential direction are defined using the stator core as a reference, one of a radially outer side and a radially inner side is a radially first side, and the other of the radially outer side and the radially inner side is a radially second side; and
   a plurality of coils attached to the stator core, the plurality of coils each including a main body that is inserted in the plurality of slots and includes two slot housed portions and coil end portions including oblique portions extending obliquely with respect to the axial direction, a radially first side end portion formed from one of the slot housed portions, and a radially second side end portion formed from the other one of the slot housed portions, wherein
   the plurality of coils includes a first coil and a second coil that is housed in slots located away, in the circumferential direction, from slots in which the first coil is housed and that is provided with the radially second side end portion to be bonded to the radially first side end portion of the first coil, and
   the radially first side end portion includes a first oblique portion extending obliquely with respect to the axial direction and extending away from the other one of the slot housed portions and an end portion extending toward the second coil in the radial direction and the circumferential direction.

2. The stator according to claim 1, wherein a bonding position between the radially first side end portion of the first coil and the radially second side end portion of the second coil is located, in the radial direction, on the radially second side of a center in the radial direction of the slots of the stator core and is closer, in the circumferential direction, to the main body of the second coil than the main body of the first coil.

3. The stator according to claim 2, wherein an inclination angle of at least a part of the first oblique portion of the radially first side end portion with respect to the stator core is made a same as an inclination angle of at least a part of the oblique portions of the main body with respect to the stator core.

4. The stator according to claim 2, wherein
   the radially second side end portion includes a second oblique portion extending obliquely with respect to the axial direction,
   an inclination angle of at least a part of the second oblique portion of the radially second side end portion with respect to the stator core is made a same as an inclination angle of at least a part of the oblique portions of the main body of the second coil with respect to the stator core, and
   the radially second side end portion includes an end portion extending from the second oblique portion in the axial direction on a side closer to the main body of the second coil of the center in the circumferential direction between a slot housed portion closer to the second coil between the slot housed portions of the first coil and a slot housed portion closer to the first coil between the slot housed portions of the second coil.

5. The stator according to claim 2, wherein the end portion of the radially first side end portion extends from the first oblique portion in the axial direction on a side closer to the main body of the first coil of the center in the circumferential direction between a slot housed portion closer to the second coil between the slot housed portions of the first coil and a slot housed portion closer to the first coil between the slot housed portions of the second coil.

6. The stator according to claim 2, wherein
   the plurality of coils are formed by a coil wire having a rectangular cross-section,
   when a side toward the second coil is a circumferentially outer side and a side far from a center in the axial direction of the stator core is an axially outer side,
   the first oblique portion protrudes from the radially first side inside a slot of the stator core and extends toward the circumferentially outer side and the axially outer side in an oblique direction, and the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

7. The stator according to claim 3, wherein
the radially second side end portion includes a second oblique portion extending obliquely with respect to the axial direction,
an inclination angle of at least a part of the second oblique portion of the radially second side end portion with respect to the stator core is made a same as an inclination angle of at least a part of the oblique portions of the main body of the second coil with respect to the stator core, and
the radially second side end portion includes an end portion extending from the second oblique portion in the axial direction on a side closer to the main body of the second coil of the center in the circumferential direction between a slot housed portion closer to the second coil between the slot housed portions of the first coil and a slot housed portion closer to the first coil between the slot housed portions of the second coil.

8. The stator according to claim 7, wherein the end portion of the radially first side end portion extends from the first oblique portion in the axial direction on a side closer to the main body of the first coil of the center in the circumferential direction between a slot housed portion closer to the second coil between the slot housed portions of the first coil and a slot housed portion closer to the first coil between the slot housed portions of the second coil.

9. The stator according to claim 7, wherein
the plurality of coils are formed by a coil wire having a rectangular cross-section,
when a side toward the first coil is a circumferentially outer side and a side far from a center in the axial direction of the stator core is an axially outer side,
the second oblique portion protrudes from the radially second side inside a slot of the stator core and extends toward the circumferentially outer side and the axially outer side in an oblique direction, and
the end portion of the radially second side end portion of the second coil further includes a fourth edgewise bent portion formed by edgewise-bending from the second oblique portion toward the axially outer side, a fifth linear portion extending from the fourth edgewise bent portion toward the axially outer side, a second flatwise bent portion formed by flatwise-bending from the fifth linear portion toward the radially second side, and a sixth linear portion extending from the second flatwise bent portion toward the radially second side and is bonded to the radially first side end portion of the first coil.

10. The stator according to claim 8, wherein
the plurality of coils are formed by a coil wire having a rectangular cross-section,
when a side toward the second coil is a circumferentially outer side and a side far from a center in the axial direction of the stator core is an axially outer side,
the first oblique portion protrudes from the radially first side inside a slot of the stator core and extends toward the circumferentially outer side and the axially outer side in an oblique direction, and
the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

11. The stator according to claim 10, wherein the end portion of the radially first side end portion extending toward the second coil in the radial direction and the circumferential direction is disposed so as to be parallel to an end surface of the stator core.

12. The stator according to claim 1, wherein an inclination angle of at least a part of the first oblique portion of the radially first side end portion with respect to the stator core is made a same as an inclination angle of at least a part of the oblique portions of the main body with respect to the stator core.

13. The stator according to claim 12, wherein
the radially second side end portion includes a second oblique portion extending obliquely with respect to the axial direction,
an inclination angle of at least a part of the second oblique portion of the radially second side end portion with respect to the stator core is made a same as an inclination angle of at least a part of the oblique portions of the main body of the second coil with respect to the stator core, and
the radially second side end portion includes an end portion extending from the second oblique portion in the axial direction on a side closer to the main body of the second coil of the center in the circumferential direction between a slot housed portion closer to the second coil between the slot housed portions of the first coil and a slot housed portion closer to the first coil between the slot housed portions of the second coil.

14. The stator according to claim 12, wherein the end portion of the radially first side end portion extends from the first oblique portion in the axial direction on a side closer to the main body of the first coil of the center in the circumferential direction between a slot housed portion closer to the second coil between the slot housed portions of the first coil and a slot housed portion closer to the first coil between the slot housed portions of the second coil.

15. The stator according to claim 12, wherein
the plurality of coils are formed by a coil wire having a rectangular cross-section,
when a side toward the second coil is a circumferentially outer side and a side far from a center in the axial direction of the stator core is an axially outer side,
the first oblique portion protrudes from the radially first side inside a slot of the stator core and extends toward the circumferentially outer side and the axially outer side in an oblique direction, and
the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

16. The stator according to claim 12, wherein the end portion of the radially first side end portion extending toward the second coil in the radial direction and the circumferential direction is disposed so as to be parallel to an end surface of the stator core.

17. The stator according to claim 13, wherein the end portion of the radially first side end portion extends from the first oblique portion in the axial direction on a side closer to the main body of the first coil of the center in the circumferential direction between a slot housed portion closer to the second coil between the slot housed portions of the first coil and a slot housed portion closer to the first coil between the slot housed portions of the second coil.

18. The stator according to claim 17, wherein
the plurality of coils are formed by a coil wire having a rectangular cross-section,
when a side toward the second coil is a circumferentially outer side and a side far from a center in the axial direction of the stator core is an axially outer side,
the first oblique portion protrudes from the radially first side inside a slot of the stator core and extends toward the circumferentially outer side and the axially outer side in an oblique direction, and
the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

19. The stator according to claim 18, wherein the end portion of the radially first side end portion extending toward the second coil in the radial direction and the circumferential direction is disposed so as to be parallel to an end surface of the stator core.

20. The stator according to claim 1, wherein
the radially second side end portion includes a second oblique portion extending obliquely with respect to the axial direction,
an inclination angle of at least a part of the second oblique portion of the radially second side end portion with respect to the stator core is made a same as an inclination angle of at least a part of the oblique portions of the main body of the second coil with respect to the stator core, and
the radially second side end portion includes an end portion extending from the second oblique portion in the axial direction on a side closer to the main body of the second coil of the center in the circumferential direction between a slot housed portion closer to the second coil between the slot housed portions of the first coil and a slot housed portion closer to the first coil between the slot housed portions of the second coil.

21. The stator according to claim 20, wherein the end portion of the radially first side end portion extends from the first oblique portion in the axial direction on a side closer to the main body of the first coil of the center in the circumferential direction between a slot housed portion closer to the second coil between the slot housed portions of the first coil and a slot housed portion closer to the first coil between the slot housed portions of the second coil.

22. The stator according to claim 21, wherein
the plurality of coils are formed by a coil wire having a rectangular cross-section,
when a side toward the second coil is a circumferentially outer side and a side far from a center in the axial direction of the stator core is an axially outer side,
the first oblique portion protrudes from the radially first side inside a slot of the stator core and extends toward the circumferentially outer side and the axially outer side in an oblique direction, and
the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

23. The stator according to claim 22, wherein the end portion of the radially first side end portion extending toward the second coil in the radial direction and the circumferential direction is disposed so as to be parallel to an end surface of the stator core.

24. The stator according to claim 1, wherein the end portion of the radially first side end portion extends from the first oblique portion in the axial direction on a side closer to the main body of the first coil of the center in the circumferential direction between a slot housed portion closer to the second coil between the slot housed portions of the first coil and a slot housed portion closer to the first coil between the slot housed portions of the second coil.

25. The stator according to claim 24, wherein
the plurality of coils are formed by a coil wire having a rectangular cross-section,
when a side toward the second coil is a circumferentially outer side and a side far from a center in the axial direction of the stator core is an axially outer side,
the first oblique portion protrudes from the radially first side inside a slot of the stator core and extends toward the circumferentially outer side and the axially outer side in an oblique direction, and
the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

26. The stator according to claim 25, wherein the end portion of the radially first side end portion extending toward the second coil in the radial direction and the circumferential direction is disposed so as to be parallel to an end surface of the stator core.

27. The stator according to claim 1, wherein
the plurality of coils are formed by a coil wire having a rectangular cross-section,
when a side toward the second coil is a circumferentially outer side and a side far from a center in the axial direction of the stator core is an axially outer side,
the first oblique portion protrudes from the radially first side inside a slot of the stator core and extends toward the circumferentially outer side and the axially outer side in an oblique direction, and
the end portion of the radially first side end portion of the first coil further includes a first edgewise bent portion formed by edgewise-bending from the first oblique portion toward the axially outer side, a first linear portion extending from the first edgewise bent portion toward the axially outer side, a first flatwise bent portion formed by flatwise-bending from the first linear portion toward the radially second side, a second linear portion extending from the first flatwise bent portion toward the radially second side, a second edgewise bent portion formed by edgewise-bending from the second linear portion toward the circumferentially outer side, a third linear portion extending from the second edgewise bent portion toward the circumferential outer side and the radially second side in the oblique direction, a third edgewise bent portion formed by edgewise-bending from the third linear portion toward the radially second side, and a fourth linear portion extending from the third edgewise bent portion toward the radially second side.

28. The stator according to claim 1, wherein the end portion of the radially first side end portion extending toward the second coil in the radial direction and the circumferential direction is disposed so as to be parallel to an end surface of the stator core.

* * * * *